(12) United States Patent
Fukuchi

(10) Patent No.: US 7,949,260 B2
(45) Date of Patent: *May 24, 2011

(54) EVALUATION AND ADJUSTMENT METHOD OF OPTICAL RECEIVER AND OPTICAL COMMUNICATION SYSTEM

(75) Inventor: Kiyoshi Fukuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 795 days.

This patent is subject to a terminal disclaimer.

(21) Appl. No.: 11/878,207

(22) Filed: Jul. 23, 2007

(65) Prior Publication Data
US 2008/0138065 A1 Jun. 12, 2008

(30) Foreign Application Priority Data

Aug. 16, 2006 (JP) ................................. 2006-221738

(51) Int. Cl.
*H04B 10/06* (2006.01)
(52) U.S. Cl. ........ 398/202; 398/183; 398/188; 398/212; 398/213; 398/214; 398/209; 398/33; 398/38; 385/24; 385/27; 385/11; 385/15; 385/1; 356/477; 356/460
(58) Field of Classification Search .................. 398/183, 398/188, 186, 189, 198, 25, 26, 27, 33, 38, 398/158, 159, 160, 161, 162, 154, 155, 202, 398/203, 204, 206, 208, 209, 210, 213, 214, 398/81, 140, 141; 385/1, 11, 15, 24, 27; 356/477, 460
See application file for complete search history.

(56) References Cited

U.S. PATENT DOCUMENTS

| 7,260,330 B2 * | 8/2007 | Chew et al. ................... 398/154 |
| 7,266,311 B2 * | 9/2007 | Haunstein et al. ............ 398/209 |
| 7,477,852 B2 * | 1/2009 | Agarwal et al. ............... 398/210 |
| 2006/0171720 A1 | 8/2006 | Agarwal et al. |
| 2008/0219680 A1 * | 9/2008 | Omori et al. ................... 398/212 |

FOREIGN PATENT DOCUMENTS

| JP | 63-206054 | 8/1988 |
| JP | 04-248721 | 9/1992 |
| JP | 07-066777 | 3/1995 |
| JP | 2002-323383 | 11/2002 |
| JP | 2003-60580 | 2/2003 |
| JP | 2005-80304 | 3/2005 |
| JP | 2005-286614 | 10/2005 |

(Continued)

OTHER PUBLICATIONS

Japanese Official Action—2006-221738.

(Continued)

*Primary Examiner* — Hanh Phan
(74) *Attorney, Agent, or Firm* — Young & Thompson

(57) ABSTRACT

An evaluation method of an optical receiver of an optical communication system, including a DPSK (Differential Phase Shift Keying) signal modulated by a specific data series, a delay interferometer for performing delay detection on the DPSK signal, an optical receiver for receiving each of two optical outputs of the delay interferometer and outputting a difference signal, and a spectrum analyzer for measuring a spectrum of an output electrical signal of the optical receiver, comprising monitoring a specific frequency component of the spectrum analyzer and detecting a delay difference and a deviation in optical reception level between the two outputs of the delay interferometer and the optical receiver.

17 Claims, 10 Drawing Sheets

FOREIGN PATENT DOCUMENTS

| | | |
|---|---|---|
| JP | 2006-033213 | 2/2006 |
| JP | 2006-054660 | 2/2006 |
| JP | 2006-217605 | 8/2006 |

OTHER PUBLICATIONS

Jeffrey H. Sinsky et al.—A 40-Gb/s Integrated Balanced Optical Front End and RZ-DPSK Performance—vol. 15, No. 8, Aug. 2003—pp. 1-7.

Concise explanation of "Performances of CSRZ-DPSK and RZ-DPSK in 43-Gbit/s/ch DWDM G.652 single-mode-fiber transmission"—Sep. 23-26, 2003.

Gnauck et al., "Demonstration of 42.7-Gb/s DPSK Receiver with 45 Photons/Bit Sensitivity," IEEE Photonics Tech. Lets., vol. 15, No. 1, pp. 99-101 (Jan. 2003).

\* cited by examiner

INTENSITY MODULATION

DPSK

EVALUATION AND ADJUSTMENT METHOD OF OPTICAL RECEIVER AND OPTICAL COMMUNICATION SYSTEM

This application is based upon and claims the benefit of priority from Japanese patent applications No. 2006-221738, filed on Aug. 16, 2006, the disclosure of which is incorporated herein its entirety by reference.

BACKGROUND OF THE INVENTION

1. Field of the Invention

The present invention relates to evaluation and adjustment methods of an optical receiver and an optical communication system, and in particular, to the evaluation and adjustment methods of an optical receiver and optical communication system for evaluating and adjusting a delay and a level difference in two optical paths between a delay interferometer and the optical receiver.

2. Description of the Related Art

An optical fiber communication system is an important technology for realizing long-distance and large-capacity communication. The optical fiber communication system which is currently commercialized uses an intensity modulation method. The intensity modulation method is a method wherein transmission is performed by assigning "1" or "0" of a digital signal to whether or not there is an optical pulse. The intensity modulation method has been applied to commercialization by taking advantage of being a method of easily generating and detecting a modulation signal and capable of long-distance transmission.

Optical fiber communication is required to be faster in conjunction with increasingly larger capacity of information transmission in recent years. While a currently commercialized data transfer rate is 10 Gbps at the maximum, research and development of a system of 40-Gbps data transfer rate as a next-generation system are committedly underway at present. Furthermore, cost reduction due to extended transmission distance is also strongly required so that a transmission technology for a distance exceeding 1,000 km is ongoing.

There are two major problems in realizing higher speed and longer distance of the optical fiber communication. Firstly, it is a countermeasure against optical noise accumulation. If a transmission rate is heightened in the intensity modulation method, signal bands to be used increase and so an amount of noise that the system receives also increases. As a result of this, a value of a signal-to-noise ratio becomes smaller at a receiving end so that code errors increase, which is quality deterioration.

In the case of rendering the transmission distance longer, it is necessary to increase optical amplifier repeaters for loss compensation. The signal-to-noise ratio also deteriorates at the receiving end due to accumulation of optical noise generated by the optical amplifiers. Therefore, it is necessary, for the sake of realizing the higher speed and longer distance, to reduce the optical noise accumulation or develop a transmission system which is strong against the optical noise accumulation.

In recent years, concerning such a problem of the optical noise accumulation, attention has been focused on a phase modulation method, and in particular, on a differential phase shift keying (DPSK) method. The DPSK method is a method of changing optical phases of adjacent bit slots by 180 degrees in order to transmit "1" and "0" of digital signals. Especially, attention is focused on a system combining the DPSK method with a 1-bit delay detection receiving system in terms of its high performance and easiness of configuration.

This system changes the phases of the bit slots by 180 degrees in the case of "1" and leaves the optical phases as-is in the case of "0" as to transmit data at a transmitting end. At the receiving end, it branches a received signal, places a 1-bit delay element on one branch and then causes the two signals to interfere. As a result of this, intensity of interference signals becomes maximal if the phases are the same as the signals of immediately preceding bit slot, and quenching occurs if a phase difference becomes 180 degrees. This principle is used to convert information applied to a phase change to intensity information and receive it.

Use of the DPSK method allows communication with few errors even in a receiving state in which the signal-to-noise ratio is lower than that of the intensity modulation method. A reason for this is indicated below. FIGS. 9A and 9B are diagrams showing an example of a relation of intersymbol distance between a DPSK signal and an ordinary intensity signal. FIG. 9A shows placement of "1" and "0" codes on a complex electric field plane by the intensity modulation method, and FIG. 9B shows the placement by the DPSK method.

According to FIGS. 9A and 9B, the distance between the "1" and "0" codes by the DPSK method is twice as large as that of the intensity modulation method. Because of such a placement relation, the DPSK method takes a twice more amount of noise, that is, half the signal-to-noise ratio to obtain the same code error rate as in the case of the intensity modulation method. Thus, the DPSK method is a transmission system which is strong against the noise and suited to higher speed and longer distance of the optical fiber communication.

A second problem is a countermeasure against distortion of an optical waveform. In the optical fiber communication, a main cause for distorting the optical waveform is a nonlinear optical effect of an optical fiber. In the case of the intensity modulation method, it is known that the distortion due to this effect becomes more significant as the transmission rate increases. As for the long-distance transmission, it is also known that accumulation of waveform distortion due to the nonlinear optical effect is a serious problem. Therefore, it is necessary, for the sake of realizing longer-distance and larger-capacity communication, to use an optical fiber of a low nonlinear optical effect or a transmission system which is strong against the nonlinear optical effect.

As for this problem, there is a proposed method of rendering each individual bit of the DPSK modulation signal as an RZ (Return to Zero) pulse and transmitting it (refer to the Patent Document 1 (Japanese Patent Laid-Open No. 2003-60580 for instance)). This method is called an RZ-DPSK method. The RZ-DPSK method suppresses the waveform distortion from two aspects by rendering a signal of each individual bit of the DPSK signal as the RZ pulse.

One is the effect that transmission at lower power is possible because light intensity of a peak portion can be higher than the same average light intensity and consequently the signal-to-noise ratio can be earned by rendering each individual bit as RZ. Another is the effect of suppressing pulse interference among the bits by implementing an RZ form. As a result of these, the method has been rapidly recognized as a method of allowing an ultralong distance transmission in 40-Gbps transmission in recent years.

The RZ-DPSK method uses a delay interferometer for converting a phase modulation signal to an intensity modulation signal in a receiver (for instance, refer to the Non-Patent Document 1 ("Demonstration of 42.7-Gb/s DPSK Receiver With 45 Photons/Bit Sensitivity", "A. H. Gnauck, S.

Chandrasekhar, J. Leuthold, L. Stulz, IEEE PHOTONICS TECHNOLOGY LETTERS, VOL. 15, NO. 1, p. 99 to 101, January 2003")). This method is called a delay interference detection method, which has an advantage that the optical signal for the local oscillator is no longer necessary and miniaturization is possible in comparison with a coherent receiving method.

FIG. 10 is a circuit diagram of an example of a Mach-Zehnder delay interferometer. With reference to FIG. 10, the delay interferometer is configured by including a directional coupler 301 for branching light of an input portion, a delay device 304 for providing one arm 302 after branching with a delay of a time slot equivalent to 1 bit or so of the bit rate of the phase modulation signal, the other arm 303, and a directional coupler 305 for multiplexing the light from the two arms again.

Phase modulation light inputted to the delay interferometer is halved into equal power by the directional coupler 301 to be led to the first arm 302 and the second arm 303. In this case, the light which passes a waveguide and gets coupled to the first arm 302 has its optical phase shifted by 90 degrees. The light having propagated through the two arms is branched in two by the output portion of the directional coupler 305 respectively.

A half of the light from the first arm 302 and a half of the light from the second arm 303 are outputted to a first output port 306 of the directional coupler 305. In this case, the light from the second arm 303 has its optical phase shifted by 90 degrees. As a result of this, both the light having passed through the first arm 302 and the light having passed through the second arm 303 have their phases shifted by 90 degrees.

A second output port 307 of the directional coupler 305 also has the half of the light from the first arm 302 and the half of the light from the second arm 303 outputted thereto. In this case, the light from the first arm 302 undergoes the phase shift of 90 degrees so that only the light having passed through the first arm undergoes the phase shift of 90 degrees plus 90 degrees, that is, 180 degrees.

As a result of this, in the case where the light from the first arm 302 and the light from the second arm 303 at the first output port 306 are put in the same phase by adjusting one of the arms, the light from the first arm 302 and the light from the second arm 303 have opposite phases at the second output port 307.

In this case, if CW (Continuous Wave) light is inputted to the interferometer, the light is mutually intensified and outputted at the first output port 306 while no light is outputted at the second output port 307 as a result of interference canceling due to the opposite phases.

A description will be given as to the operation when the DPSK signal enters the interferometer. The DPSK signal has the optical phases as "0", "π" as against "0", "1" of the digital signal. As a result of this, the first arm 306 of the interferometer has the light outputted in the same phase in the case where the adjacent bits have the same phase. In the case where the adjacent bits have different phases, that is, there is a difference of π, the light is mutually cancelled and quenched. As a result of this, phase information is transformed to intensity information.

The second arm 307 of the interferometer has the light quenched in the case where the continuous bits have the same phase. In the case where the bits have different phases, that is, there is a difference of π, the phase difference of the light between the two arms is 0 or 2π to be mutually intensified so that the light is consequently outputted.

As above, if the continuous bits of the DPSK signal have the same phase, the light is outputted from the first arm 306. If there is a difference of π, the light is outputted from the second arm 307.

As for the output of the interferometer, the port for outputting the light is switched due to the phase difference of the continuous bits. Therefore, an optical receiver performs differential reception for converting each of the two outputs of the interferometer to the electrical signal from the optical signal and calculating the difference of the signals. Thus, amplitude of the signal to be identified becomes maximal, and resistance to the aforementioned optical noise becomes highest.

To maximize the performance by the differential reception, it is created so that there is equal propagation delay from the directional coupler 305 of the output of the interferometer 107 shown in FIG. 10 to a differential calculation portion 110 of the optical receiver 108 including two photo-detectors 109A and 109B.

A related method shown in FIG. 11 has been used as a method of examining whether or not the propagation delay between the interferometer and the optical receiver is equal. FIG. 11 is a block diagram of an example of a related optical communication system. FIG. 11 shows an example of a configuration for measuring a delay and a level difference between the interferometer and the optical receiver.

With reference to FIG. 11, an optical signal to be used for the examination is generated by a DPSK optical transmitter portion 101. The light outgoing from a light source 102 has its phase modulated by a data modulator 103. The signal for driving data modulation is a signal from a random pattern generator 400. An output signal from the data modulator 103 is further modulated by a clock modulator 104 to convert the intensity to the pulse signal. The clock modulator 104 is driven by a clock signal 106.

An RZ-DPSK signal is generated by the above configuration. This optical signal is input to an interferometer 107. The optical signal input to the interferometer 107 is converted to the intensity information from the phase information and received by the differential optical receiver 108. One of the outputs of the interferometer 107 is input to the first photo-detector 109A, and the other output is input to the second photo-detector 109B so as to convert the outputs to the electrical signals from the optical signals. The signals converted to electrical signals are rendered as differential signals by the differential circuit 110 to be outputted. These output signals are monitored by a sampling oscilloscope 401 of which measurement band is wide enough for the received signals.

FIGS. 12A to 12F are diagrams showing an example of an eye pattern for measuring the delay and level difference between the related interferometer and optical receiver. FIG. 12A shows the case of monitoring with a wideband optical receiver having no delay difference and level difference. FIG. 12B shows the case of monitoring with the wideband optical receiver having no level difference with a delay difference of 20% of the bit slots. FIG. 12C shows the case of monitoring with the wideband optical receiver having no delay difference with a level difference of 1.5 dB. FIG. 12D shows the case of monitoring with the optical receiver having no delay difference and level difference, of which band is 70% of the bit rate. FIG. 12E shows the case of monitoring with the optical receiver having no level difference with a delay difference of 20% of the bit slots, of which band is 70% of the bit rate. FIG. 12F shows the case of monitoring with the optical receiver having no delay difference with a level difference of 1.5 dB, of which band is 70% of the bit rate.

In the case where the two paths have equal gain (loss) and propagation delay, a measured waveform becomes a waveform which is symmetrical side to side and up and down as in FIG. 12A. In the case where only the propagation delay is different between the two, the measured waveform when a propagation delay difference is 20% of bit slot width as an example is shown in FIG. 12B. In this case, the waveform becomes asymmetrical in a time axis direction.

FIG. 12C shows the measured waveform in the case where the two paths have unbalanced gain, that is, the case where a gain difference is 1.5 dB for instance. In this case, the waveform becomes asymmetrical in an amplitude direction (vertical axis direction). In the case where both the delay and gain are unbalanced, a monitored waveform becomes superposition of changes in these two-axis directions. The delay difference and gain difference between the interferometer 107 and the optical receiver 108 are examined by utilizing these graphic changes.

There is a disclosure of an example of the optical communication system using automatic feedback control for the sake of fine-tuning the delay interferometer (refer to the Patent Document 2 (Japanese Patent Laid-Open No. 2005-80304 (paragraphs 0009, 0024, 0026, 0045, FIGS. 1 and 5C) for instance)).

However, there is the following problem to the RZ-DPSK reception method using the interferometer indicated in the conventional technology.

The first problem is that the sampling oscilloscope 401 or the optical receiver 108 needs to be wideband, which is used to examine whether or not the delay and the gain are equal.

The reason for this is as indicated below.

As shown in FIGS. 12A to 12C, a waveform change in the output of the optical receiver 108 is utilized to examine whether or not the delay and gain are equal. Especially, examination accuracy is influenced by whether or not a rising edge and a trailing edge of the waveform and a pulse height can be accurately monitored since a time displacement and an amplitude difference of the pulse are judged from a graphic change.

As the influence exerted on the graphic change by the measurement band, the waveform was monitored in the case where the band of the sampling oscilloscope 401 is only 70% of the bit rate. In the case of FIG. 12D having neither delay difference nor gain difference, the waveform is symmetrical in both the time and amplitude directions.

In the case shown in FIG. 12E having the delay difference of 20% of the bit slots, the rising edge and trailing edge of the pulse are gentle in comparison with FIG. 12B so that an amount of displacement is rather unclear. Furthermore, in the case of FIG. 12F having the gain difference of 1.5 dB, deterioration of an asymmetry property is unclear in the amplitude direction due to lowering of a peak level of the pulse so that it is difficult to judge a difference from FIG. 12D.

Thus, the monitoring requires a measuring device of a wide band, which results in an expensive monitoring system. There is also a problem that the band of the monitoring system needs to be maintained.

The second problem is that an optimal state of the symmetric property and delay can only be graphically represented so that it becomes non-quantitative and an examination result becomes personal.

The reason for this is as indicated below.

As previously described, the related technology judges whether or not there are the delay difference and gain difference from the graphic changes of the waveform. Therefore, there is a possibility that a judgment of being alike or different as to a graphic characteristic of the waveform may depend on subjectivity of a measurer in addition to differences in a measurement environment and a device to be used. Definitive performance is quantifiable by using the code error rate and the like. In the case of making a judgment on the extent to which an output waveform graphic should be adjusted in order to optimize code error rate performance, however, it depends on experience and skills of a worker and a quantitative examination is difficult. As a result of this, there is a problem that it is difficult to perform a quantitative evaluation of the performance resulting from the delay difference and gain difference.

The delay that should be adjusted in the invention disclosed in the Patent Document 2 is optical length of an upper arm and a lower arm of a Mach-Zehnder interferometer (MZ1) (refer to paragraphs 0024 and 0026 of the Patent Document 2). In comparison, the two portions to be judged or adjusted in the present invention are the portions between the delay interferometer and the photo-detectors (PD), that is, the portions from the multiplexing by the delay interferometer onward. Therefore, the invention disclosed in the Patent Document 2 is entirely different from the present invention as to its object, configuration and action.

BRIEF SUMMARY OF THE INVENTION

An exemplary object of the invention is to provide evaluation and adjustment methods of an optical receiver and an optical communication system capable of detecting and adjusting a delay difference and a level difference of a configuration of an interferometer to a photo-detector of the optical receiver for DPSK more easily and quantitatively than the related art.

An exemplary aspect of the invention is an evaluation method of an optical receiver of an optical communication system, including:

a DPSK (Differential Phase Shift Keying) signal modulated by a specific data series;

a delay interferometer for performing delay detection on the DPSK signal;

an optical receiver for receiving each of two optical outputs of the delay interferometer and outputting a difference signal; and a spectrum analyzer for measuring a spectrum of an output electrical signal of the optical receiver, comprising:

monitoring a specific frequency component of the spectrum analyzer and detecting a delay difference and a deviation in optical reception level between the two outputs of the delay interferometer and the optical receiver.

Another exemplary aspect of the invention is an evaluation method of an optical receiver of an optical communication system, including:

a Mach-Zehnder modulator;

a clock modulator for having the Mach-Zehnder modulator modulate a light source to a carrier-suppressed RZ (Return to Zero) with a clock of a B/N (B and N are positive integers) period;

a delay interferometer for performing delay detection on an output signal of the Mach-Zehnder modulator;

an optical receiver for receiving each of two optical outputs of the delay interferometer and outputting a difference signal; and a spectrum analyzer for measuring a spectrum of an output electrical signal of the optical receiver, comprising:

monitoring a specific frequency component of the spectrum analyzer and detecting a delay difference and a deviation in optical reception level between the two outputs of the delay interferometer and the optical receiver.

Another exemplary aspect of the invention is an adjustment method of an optical receiver of an optical communication system, including:

a DPSK (Differential Phase Shift Keying) signal modulated by a specific data series;

a delay interferometer for performing delay detection on the DPSK signal;

an optical receiver for receiving each of two optical outputs of the delay interferometer and outputting a difference signal;

an adjuster for adjusting intensity or delay or both of them of an optical signal provided to one or both of two paths between an output of the delay interferometer and an input of the optical receiver; and a spectrum analyzer for measuring a spectrum of an output electrical signal of the optical receiver, comprising:

adjusting the intensity or delay or both of them of the adjuster to maximize a specific frequency component of the spectrum analyzer.

Another exemplary aspect of the invention is an adjustment method of an optical receiver of an optical communication system, including:

a Mach-Zehnder modulator;

a clock modulator for having the Mach-Zehnder modulator modulate a light source to a carrier-suppressed RZ (Return to Zero) with a clock of a B/N (B and N are positive integers) period;

a delay interferometer for performing delay detection on an output signal of the Mach-Zehnder modulator;

an optical receiver for receiving each of two optical outputs of the delay interferometer and outputting a difference signal; and an adjuster for adjusting intensity or delay or both of them of an optical signal provided to one or both of two paths between an output of the delay interferometer and an input of the optical receiver; and a spectrum analyzer for measuring a spectrum of an output electrical signal of the optical receiver, comprising:

adjusting the intensity or delay or both of them of the adjuster to maximize a specific frequency component of the spectrum analyzer.

Another exemplary aspect of the invention is an optical communication system using a DPSK (Differential Phase Shift Keying) signal, comprising:

an optical transmitter portion for outputting the DPSK signal modulated by a specific data series;

a delay interferometer for performing delay detection on the DPSK signal;

an optical receiver for receiving each of two optical outputs of the delay interferometer and outputting a difference signal; and a spectrum analyzer for measuring a spectrum of an output electrical signal of the optical receiver.

Another exemplary aspect of the invention is an optical communication system using a DPSK (Differential Phase Shift Keying) signal, comprising:

an optical transmitter means of outputting the DPSK signal modulated by a specific data series;

a delay interferometer means of performing delay detection on the DPSK signal;

an optical receiver means of receiving each of two optical outputs of the delay interferometer means and outputting a difference signal; and a spectrum analyzer means of measuring a spectrum of an output electrical signal of the optical receiver means.

DETAILED DESCRIPTION OF THE PREFERRED EMBODIMENTS

Exemplary embodiments of the invention will be described below with reference to the drawings.

First Exemplary Embodiment

Figure 1:
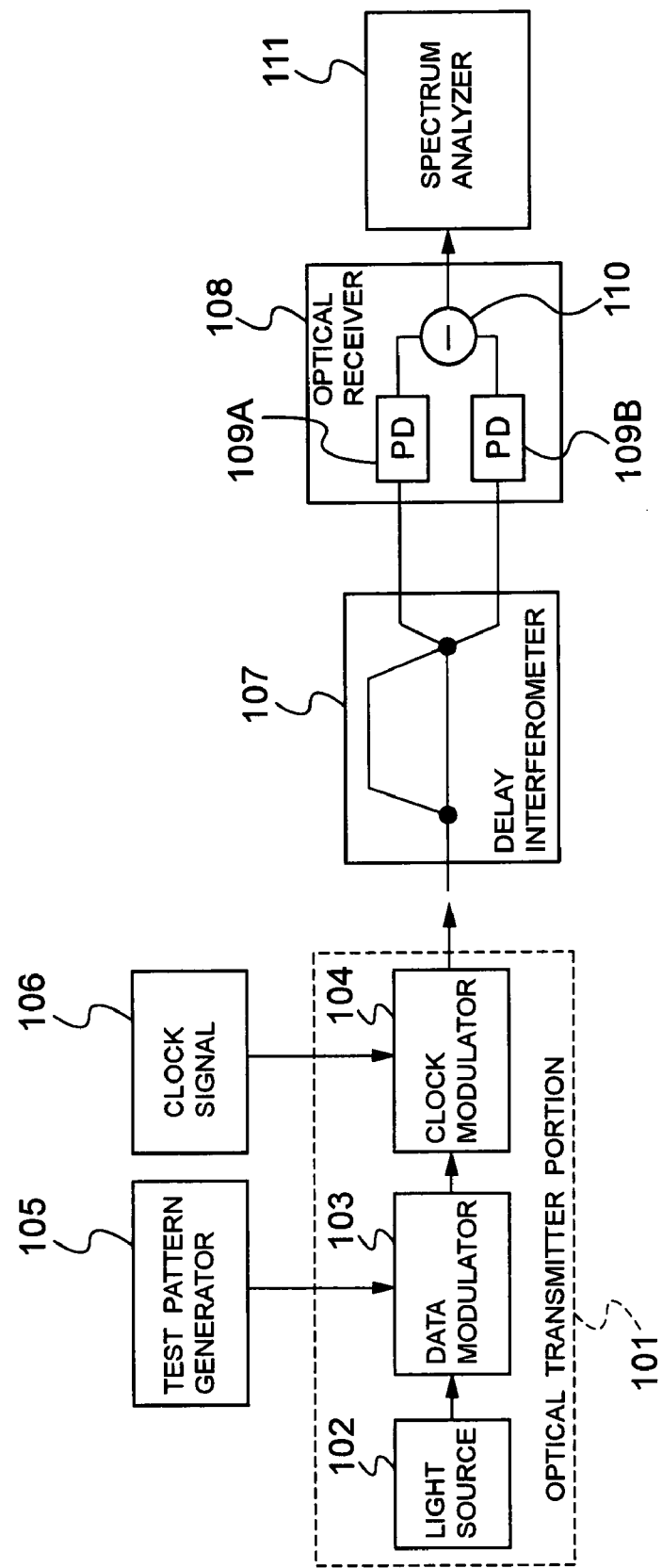
FIG. 1 is a block diagram of the first exemplary embodiment of an optical communication system according to the present invention.

FIG. 1 is a block diagram of the first exemplary embodiment of an optical communication system according to the present invention. With reference to FIG. 1, the first exemplary embodiment of the optical communication system is configured by including an optical transmitter portion 101, a delay interferometer 107, an optical receiver 108, a spectrum analyzer 111, a test pattern generator 105 and a clock signal 106.

The optical transmitter portion 101 includes a light source 102, a data modulator 103 and a clock (CLK) modulator 104, and the optical receiver 108 includes photo-detectors (PD) 109A, 109B and a differential (−) circuit 110.

In FIG. 1, the light source 102 of the optical transmitter portion 101 is a DFB (Distributed FeedBack) laser as an example, and emits CW light. An output of the light source 102 enters the data modulator 103 using a LiNbO$_3$ Mach-Zehnder modulator to undergo modulation.

The data modulator 103 has a driving electrical signal of a repetitive pattern of a test pattern ("0011" as an example) from the test pattern generator 105 inputted thereto. Output light from the data modulator 103 is connected to an input light port of the clock modulator 104 using the LiNbO$_3$ Mach-Zehnder modulator.

The driving clock signal 106 is inputted to a driving electrical signal input port of the clock modulator 104. A DPSK signal rendered as RZ and outputted from the clock modulator 104 is inputted to the delay interferometer 107.

Signals from two output ports of the delay interferometer 107 enter the two photo-detectors (PD) 109A, 109B provided to the optical receiver 108. Output electrical signals from the two photo-detectors (PD) 109A, 109B are rendered as differential signals by the differential circuit 110, and outputs thereof are inputted to the spectrum analyzer 111.

The above described the configuration of the first exemplary embodiment in detail. However, detailed configurations of the light source 102 and the clock modulator 104 of FIG. 1 will be omitted since they are well known to those skilled in the art and are not directly related to the present invention.

Next, operation of the first exemplary embodiment of the optical communication system will be described. With reference to FIG. 1, the light outputted from the light source 102 of the optical transmitter portion 101 has its phase modulated by the data modulator 103 of the LiNbO$_3$ Mach-Zehnder modulator. In this case, a DC bias of the data modulator 103 is set to a point where transmission of the light becomes minimal (null point).

A signal from the test pattern generator 105 for driving the data modulator 103 is the repetitive pattern of the aforementioned "0011." As for the amplitude required to drive the data modulator 103, twice a half-wavelength voltage Vn of the data modulator 103 is desirable. However, DPSK modulation is performed even if demodulated at a voltage smaller than that. Therefore, it may be a lower value within the range in which expansion of optical loss due to lowering of the voltage is allowed.

The light DPSK-modulated by the driving signal is further RZ-modulated by the clock modulator 104 using the LiNbO$_3$ Mach-Zehnder modulator. The driving clock signal 106 for RZ modulation is inputted to the clock modulator 104. According to this exemplary embodiment, the driving signal to the clock modulator 104 is a signal of which amplitude is 2 Vn at a frequency of B/2 against a bit rate B of the test pattern generator 105 used for a test.

The DC bias of the clock modulator 104 is set as a peak point at which transmission of the light becomes maximal, and thus a pulse width has been rendered thin and a high peak level has been taken.

The RZ modulation by the clock modulator 104 is not always necessary and only the modulation by the data modulator is also sufficient according to the present invention.

A test optical signal outputted from the clock modulator 104 is converted to intensity modulation from phase modulation by the delay interferometer 107 of an optical planar circuit type with quartz glass as an example. Two signals which converted to intensity modulation are photo-detected by the optical receiver 108 to perform differential reception.

High-speed photo-diodes as examples of the photo-detectors 109A, 109B and an IC (Integrated Circuit) for the differential circuit having an amplifying function as an example of the differential circuit 110 are provided in the optical receiver 108. However, this amplifying function can be replaced by performing optical amplification at the input of the delay interferometer 107.

Frequency component intensity of half the bit rate B of the output of the optical receiver 108 is detected by the spectrum analyzer 111. If this detection result is lower than a value acquired by a reference receiver having no delay difference and gain difference, it is detected that the delay difference or the gain difference has been generated. A narrowband-pass filter and a high-speed microwave detector may also be used to detect a spectrum component.

As for an output component of the optical receiver 108, it is possible to detect an occurrence of the delay with higher accuracy in the case of a small delay difference by detecting a bit rate component instead of half the bit rate B.

In the first exemplary embodiment of FIG. 1, if the delay difference in the paths between the delay interferometer 107 and the optical receiver 108 is as large as or larger than the bit slot, an accurate delay amount cannot be grasped by repeating "0011" as the test pattern. In this case, a larger delay can be measured by rendering the test pattern as a long pattern of "0000 ... 01111 ... 1 (consecutive pattern in which 0 is N bits and 1 is N bits)" and rendering a monitored frequency component of the spectrum analyzer 111 as a B/2N (B is the bit rate, and N is the number of the aforementioned consecutive "0" and "1") component.

Figure 2:
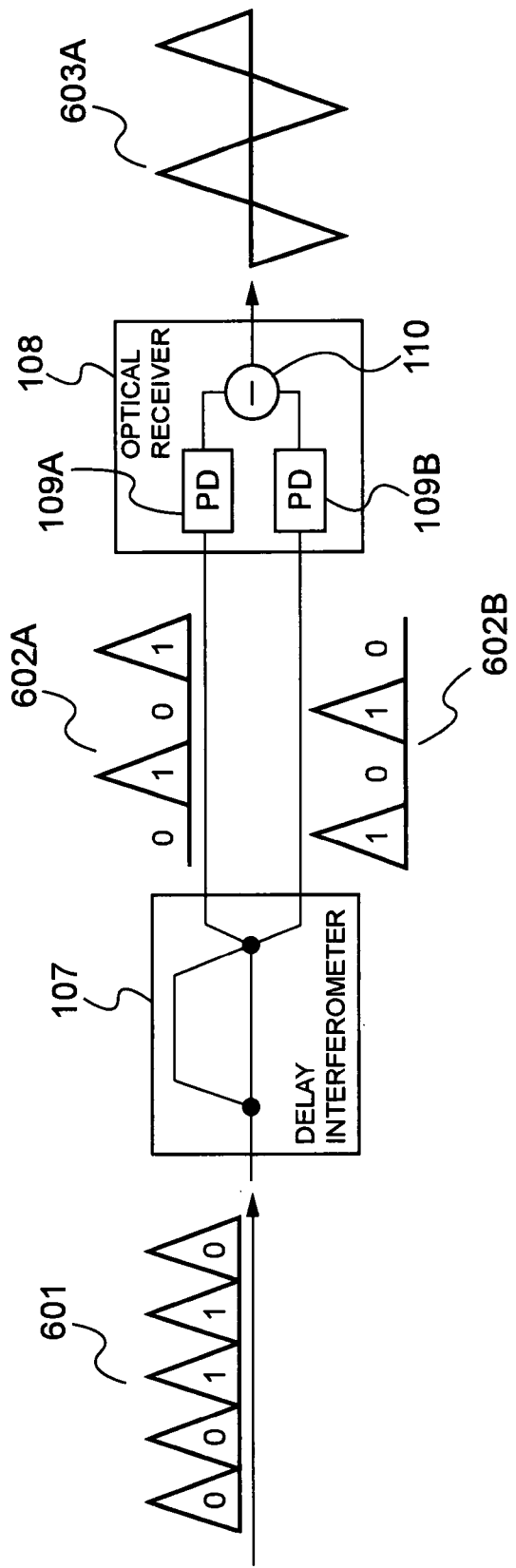
FIG. 2 is a schematic diagram for describing operation of the first exemplary embodiment.

Next, the action and effects of the first exemplary embodiment will be described. FIG. 2 is a schematic diagram for describing the operation of the first exemplary embodiment. With reference to FIG. 2, if DPSK light modulated by repetition of the particular pattern "0011" enters the delay interferometer 107, it is outputted from the two outputs of the delay interferometer 107 as intensity-modulated signals of "0101" and "1010" respectively.

If these intensity signals are differentially received by the optical receiver 108, the output signals become a bit pattern of "1, −1, 1, −1." As a result of this, the output signals become electrical signal components wherein a basic frequency is B/2 (B is a bit rate frequency) and a harmonic wave thereof is included.

Figure 3A:
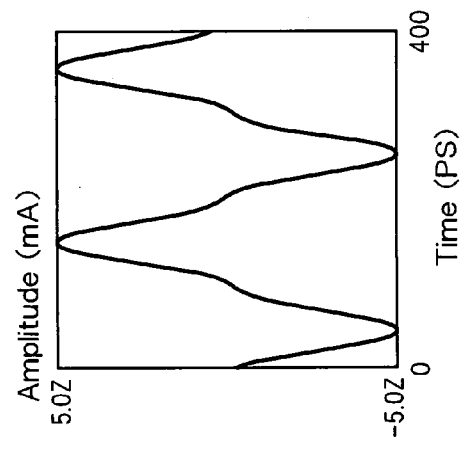
FIG. 3 are diagrams showing examples of a waveform and a spectrum of an optical receiver output signal obtained by a method of detecting delay and level differences between the interferometer and the optical receiver of the present invention.
Figure 3C:
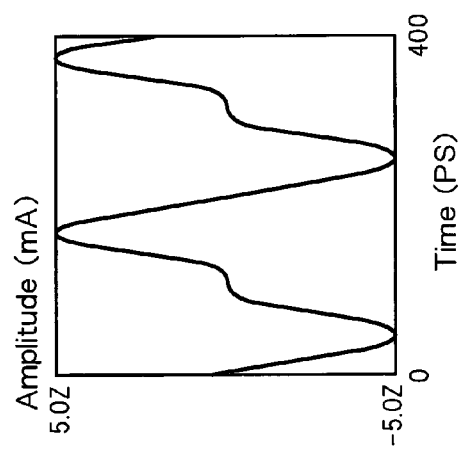
Figure 3E:
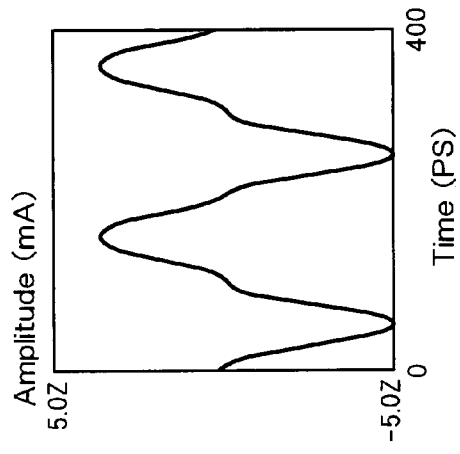
Figure 3B:
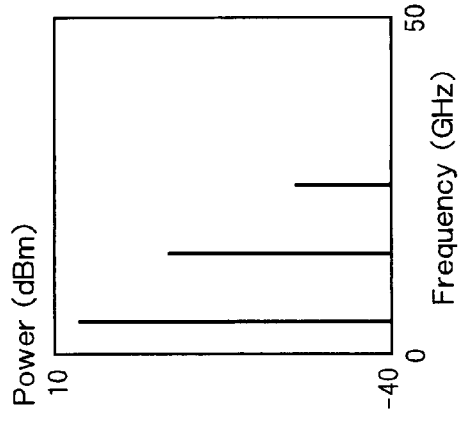
Figure 3D:
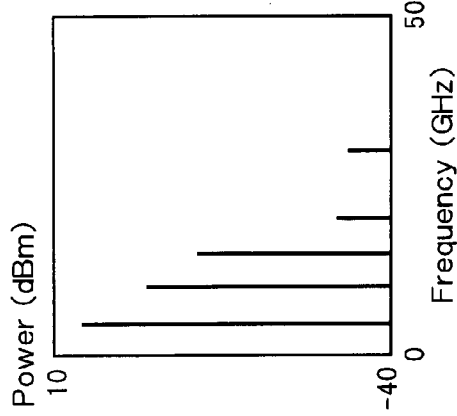
Figure 3F:
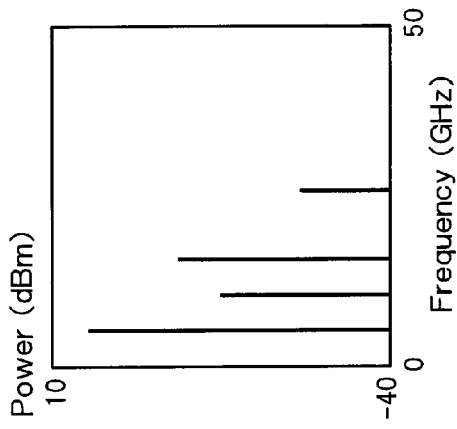

FIGS. 3A to 3F are diagrams showing examples of a waveform and a spectrum of an optical receiver output signal obtained by a method of detecting the delay and level differences between the interferometer and the optical receiver of the present invention. FIG. 3A shows the waveform in the case of monitoring with a wideband optical receiver having no delay difference and level difference. FIG. 3B shows the spectrum in the case of monitoring with the wideband optical receiver having no level difference with a delay difference of 20% of the bit slots. FIG. 3C shows the waveform in the case of monitoring with the wideband optical receiver having no delay difference with a level difference of 1.5 dB. FIG. 3D shows the spectrum in the case of monitoring with a wideband optical receiver having no delay difference and level difference. FIG. 3E shows the case of monitoring with the wideband optical receiver having no level difference with a delay difference of 20% of the bit slots. FIG. 3F shows the spectrum in the case of monitoring with the wideband optical receiver having no delay difference with a level difference of 1.5 dB.

According to this embodiment, in the case where there is no delay difference and gain difference between the delay interferometer 107 and the differential circuit 110 of the optical receiver 108, a monitored electrical signal waveform is as in FIG. 3A, and an electrical spectrum in that case is as in FIG. 3B. In this monitoring, the bit rate was set at 10 Gb/s. As is apparent from FIG. 3B, the component of 5 GHz as a basic component is the largest in this case.

In comparison, FIG. 3C shows the waveform in the case where the delay difference of 20% of the bit slots is generated, and FIG. 3D shows the spectrum thereof. As a symmetric property in the time direction has collapsed, the basic component has decreased and an even harmonic component has appeared as a large value.

Figure 4:
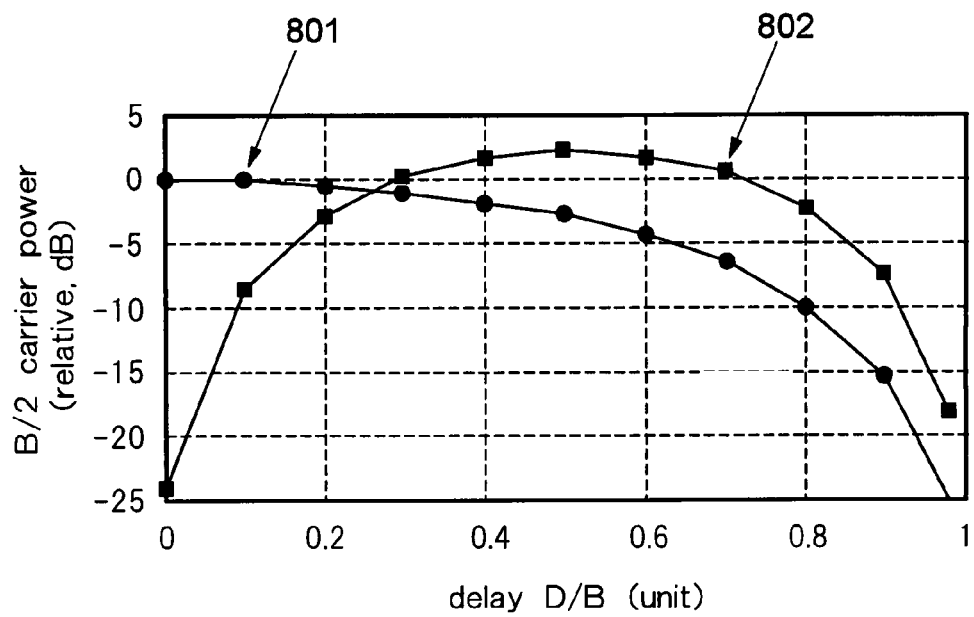
FIG. 4 is a diagram showing the intensity of a frequency component of half a bit rate B and the frequency component of the bit rate of the optical receiver output acquired against the delay difference by the detection method of the delay difference of the present invention.

FIG. 4 is a diagram showing the intensity of the frequency component of half the bit rate B and the frequency component of the bit rate of the optical receiver output acquired against the delay difference by the detection method of the delay difference of the present invention. FIG. 4 shows an intensity of a fundamental wave component 801 and an intensity of a second harmonic wave component 802 in the case where a delay difference D is changed with the gain difference remaining as 0. As a result of this, it is understandable that, as the delay difference becomes larger, the intensity of the fundamental wave component lowers and the intensity of the second harmonic wave component increases. Therefore, it is possible to detect whether or not there is the delay difference by monitoring the lowering of the fundamental wave component. In the range of the values of which delay difference is small, it is possible to detect whether or not there is the delay difference with higher accuracy by monitoring the second harmonic wave component.

Next, FIG. 3E shows the waveform in the case where the gain difference of 1.5 dB is generated in the present invention, and FIG. 3F shows the spectrum thereof. As the symmetric property in the amplitude direction has collapsed, the basic component has decreased as was expected and the even harmonic component has appeared as a large value.

Figure 5:
FIG. 5 is a diagram showing the intensity of the frequency component of half the bit rate B of the optical receiver output obtained against the level difference by the detection method of the level difference of the present invention.

FIG. 5 is a diagram showing the intensity of the frequency component of half the bit rate B of the optical receiver output obtained against the level difference by the detection method of the level difference of the present invention. FIG. 5 shows an intensity of a fundamental wave component 901 in the case where the gain difference is changed from 0 to 5 dB with the delay difference remaining as 0. As the gain difference becomes larger, the intensity of the fundamental wave component lowers, and it is possible to detect generation of the gain difference by monitoring the lowering.

As described above, the present invention uses a particular data pattern instead of a random signal as the signal for detecting the delay difference and gain difference. The present invention also uses measuring means of specific frequency component intensity by a spectrum analyzer or the like instead of eye pattern detection by a sampling oscilloscope as detection means. As for the particular pattern, it uses the DPSK light modulated by repetition of the 4-bit pattern of "0011" as an example.

If the DPSK light modulated by repetition of the particular pattern enters the interferometer, it is outputted from the two outputs of the interferometer as the intensity-modulated signals of "0101" and "1010" respectively. If these intensity signals are differentially received by the optical receiver, the output signals become a bit pattern of "1, −1, 1, −1." As a result of this, the output signals become the electrical signal components wherein the basic frequency is B/2 (B is a bit rate frequency) and the double-length wave thereof is included.

As the present invention includes the configuration, it is possible to detect and adjust the delay difference and level difference of the configuration of the interferometer to the photo-detector of the optical receiver for DPSK more easily and quantitatively than before.

Second Exemplary Embodiment

Figure 6:
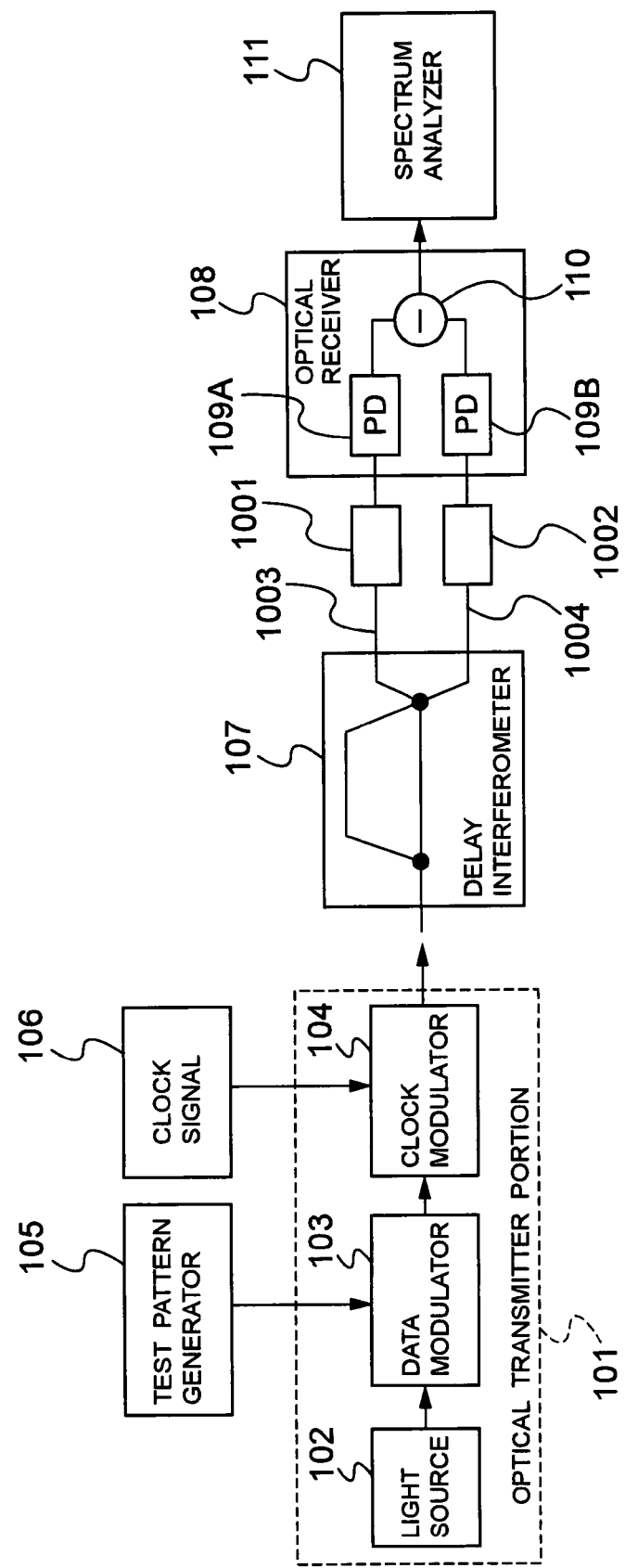
FIG. 6 is a block diagram of the second exemplary embodiment of the optical communication system according to the present invention.

FIG. 6 is a block diagram of the second exemplary embodiment of the optical communication system according to the present invention. In FIG. 6, portions of the same configuration as FIG. 1 are given the same numbers, and a description thereof will be omitted.

The second exemplary embodiment shown in FIG. 6 has the advantage of having a function of changing the delay difference and gain difference in the paths between the interferometer 107 and the optical receiver 108 and making an adjustment to minimize the delay difference and gain difference between the interferometer and the optical receiver. Optical path 1003 using a movable space mirror and a loss adjuster 1001 are provided between the interferometer 107 and the photo-detector (PD) 109A of the optical receiver 108. Similarly, optical path 1004 using a movable space mirror and a loss adjuster 1002 are provided between the interferometer 107 and the photo-detector (PD) 109B of the optical receiver 108.

The adjusters 1001 and 1002 adjust the length of the optical paths 1003 and 1004 by moving the position of the space mirror. An amount of loss is realized by putting a rotary loss disk or the like in a spatial optical path and turning the disk so that a beam spot hits a place of a desired loss. These mechanisms for changing the length of the optical path and loss may also be other means. For instance, it is possible to use change of delay and pressurization of a fiber due to thermooptical effects of a waveguide. The delay difference and gain difference in the paths are minimized by adjusting the loss and delay of the adjusters 1001 and 1002 to maximize the intensity of the frequency component of half the bit rate B which is monitored by the spectrum analyzer 111.

When adjusting the amount of delay of the adjusters 1001 and 1002 in the exemplary embodiment of FIG. 6, an adjustment may be made to minimize the frequency component of the bit rate B which is monitored by the spectrum analyzer 111.

Third Exemplary Embodiment

Figure 7:
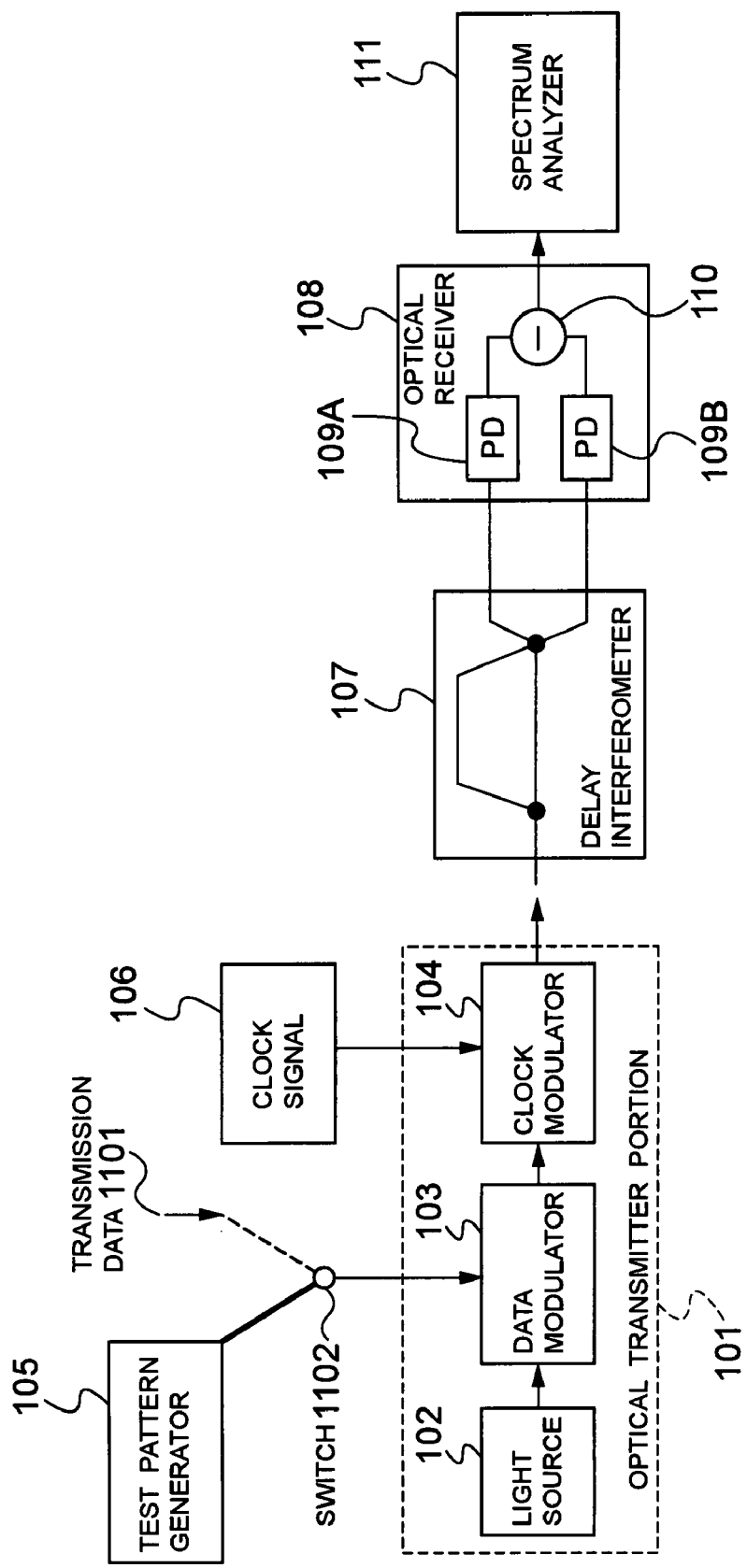
FIG. 7 is a block diagram of the third exemplary embodiment of the optical communication system according to the present invention.

FIG. 7 is a block diagram of the third exemplary embodiment of the optical communication system according to the present invention. In FIG. 7, portions of the same configuration as FIG. 1 are given the same numbers, and a description thereof will be omitted.

The third exemplary embodiment of the present invention shown in FIG. 7 is characterized in that, as to the input of the data modulator 103 of the optical transmitter portion 101, it is provided with a switch 1102 and has a function of switching between a signal from the test pattern generator 105 and transmission data 1101 and inputting one of them.

The detection or the adjustment is performed by using a signal phase-modulated by a particular test pattern in the first and second exemplary embodiments of the present invention. Therefore, a DPSK light generator dedicated to an ordinary test should be used. In comparison, a related optical transmission device is configured to include the optical transmitter and the optical receiver in the same housing.

A function of switching the input of the transmitter portion 101 to the transmission data 1101 or the test pattern generated by the test pattern generator 105 using above-mentioned configuration is employed in the third exemplary embodiment of the present invention. On the examination or the adjustment, the test becomes possible by switching the switch 1102 to the test pattern side and inputting its own output light to the receiver 108. When the test is finished, an ordinary optical transmission operation can be performed by switching the switch 1102 to the transmission data 1101 input side. According to this exemplary embodiment, it is possible to perform the examination and adjustment without preparing a dedicated optical transmitter portion.

Fourth Exemplary Embodiment

Figure 8:
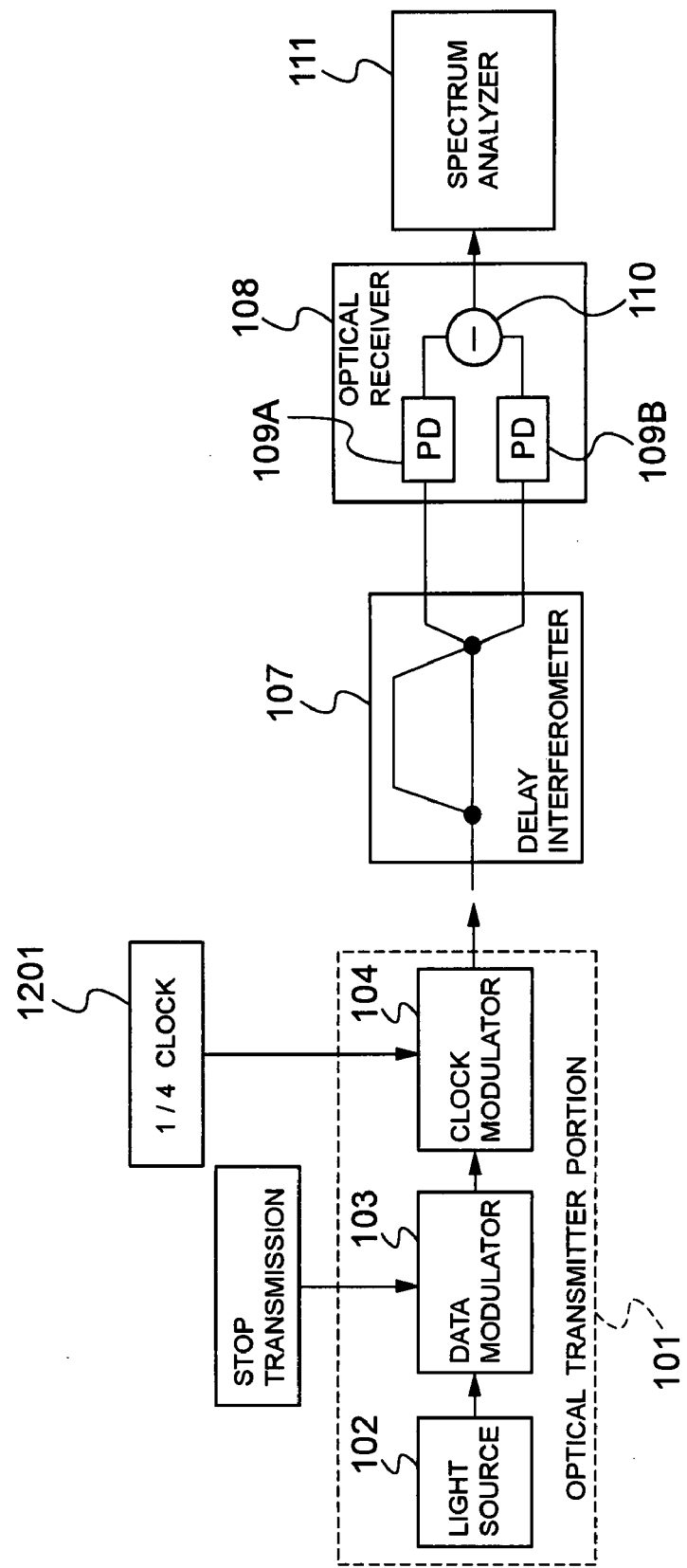
FIG. 8 is a block diagram of the fourth exemplary embodiment of the optical communication system according to the present invention.
Figure 9A:
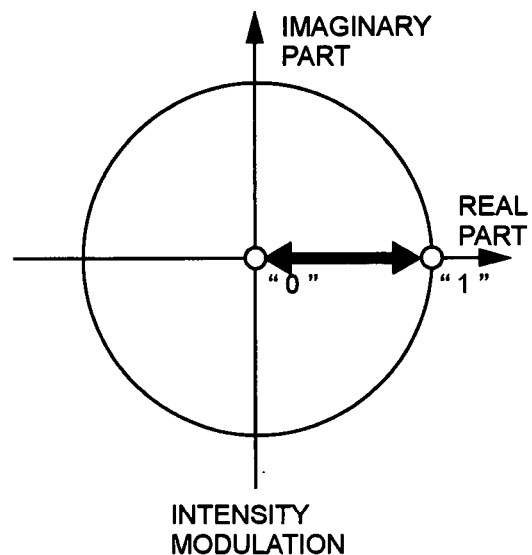
FIG. 9 are diagrams showing an example of a relation of intersymbol distance between a DPSK signal and an ordinary intensity signal.
Figure 9B:
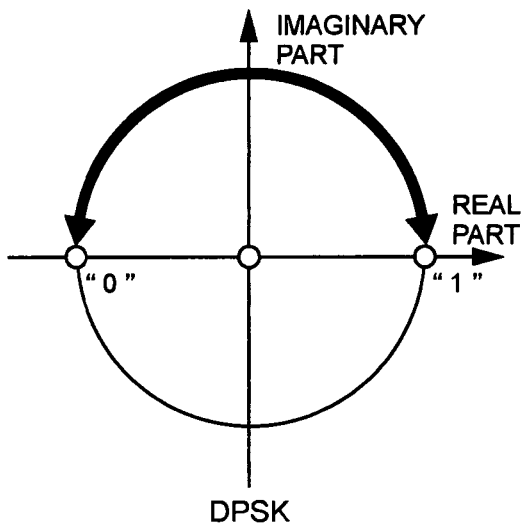
Figure 10:
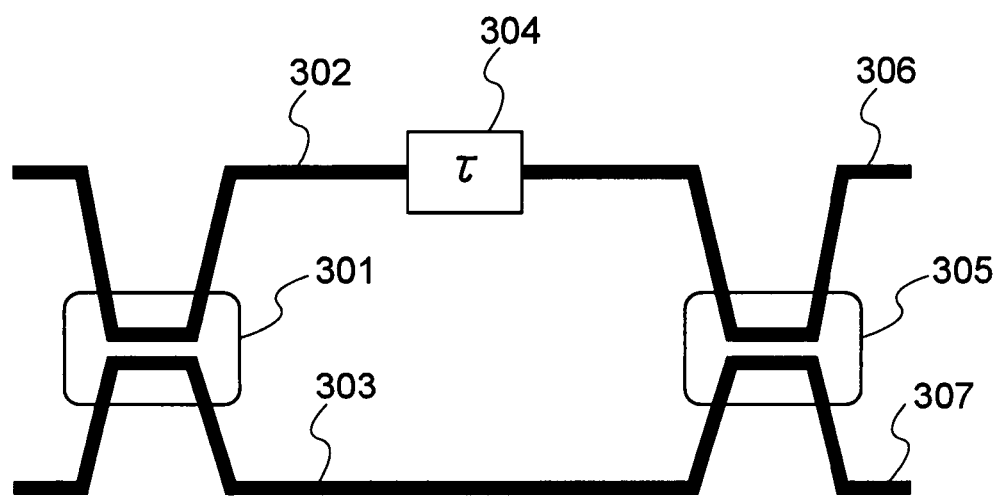
FIG. 10 is a circuit diagram of an example of a Mach-Zehnder delay interferometer.
Figure 11:
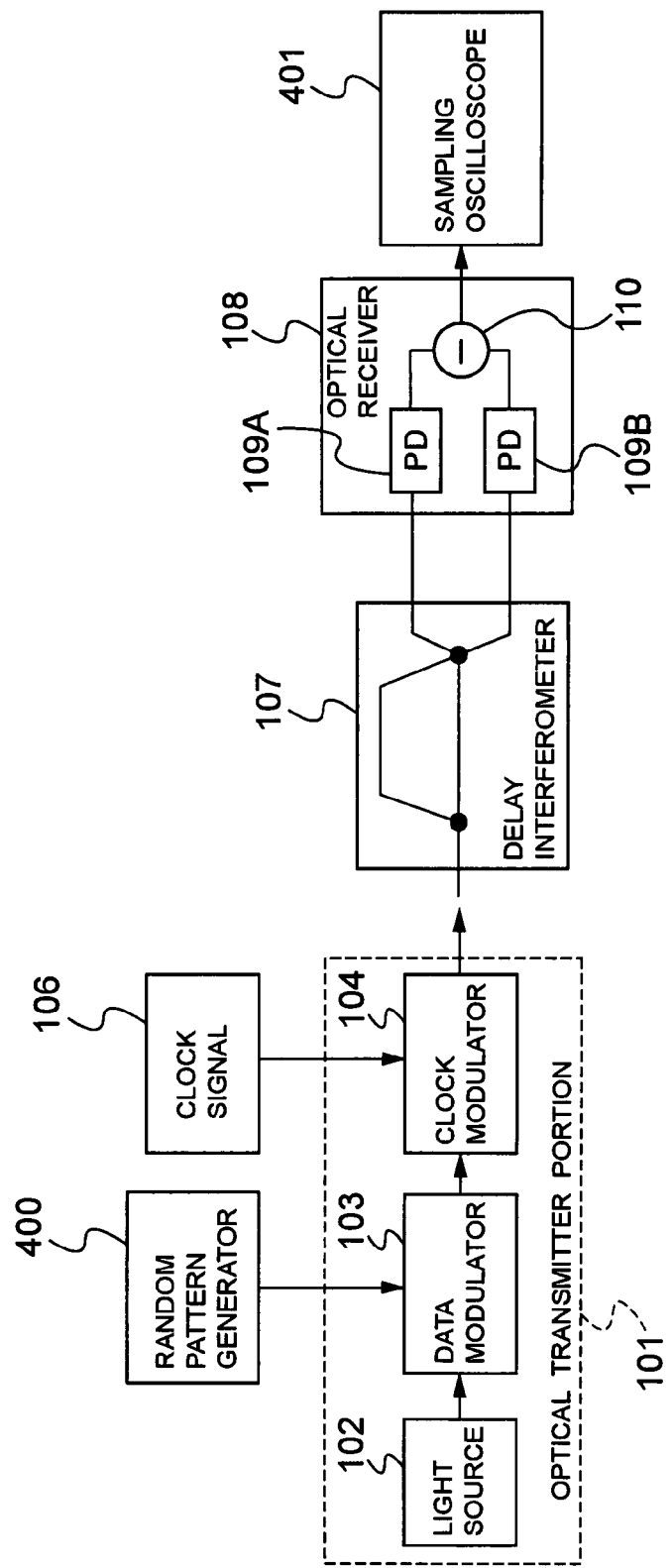
FIG. 11 is a block diagram of an example of a related optical communication system.
Figure 12A:
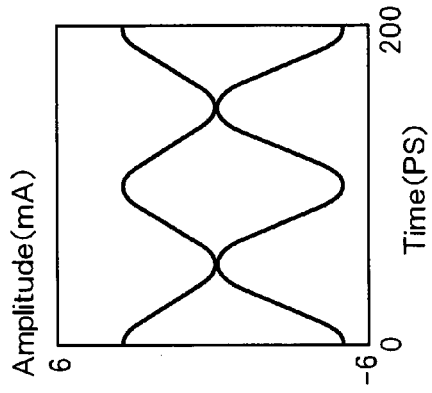
FIG. 12 are diagrams showing an example of an eye pattern for measuring the delay and level differences between the related interferometer and optical receiver.
Figure 12B:
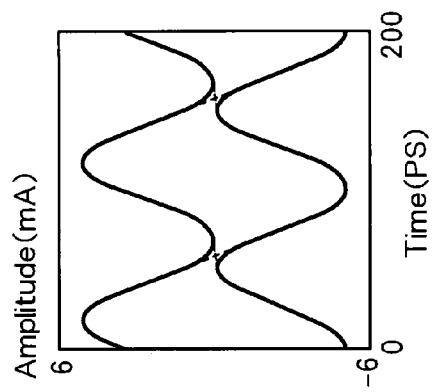
Figure 12C:
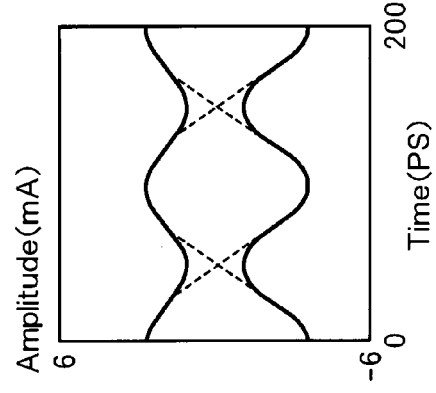
Figure 12D:
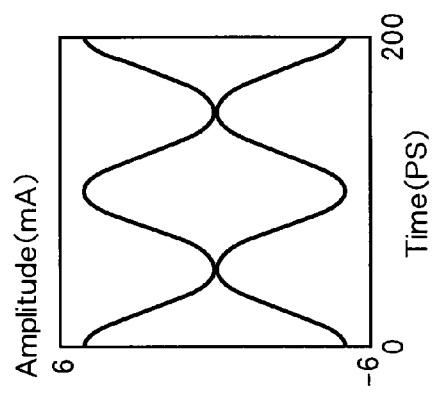
Figure 12E:
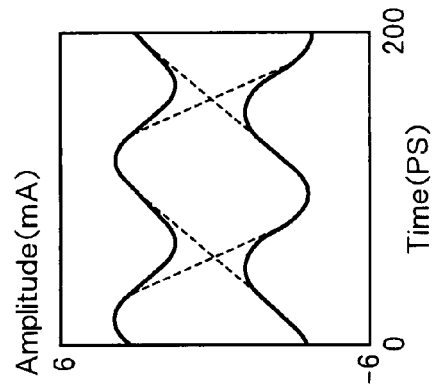
Figure 12F:
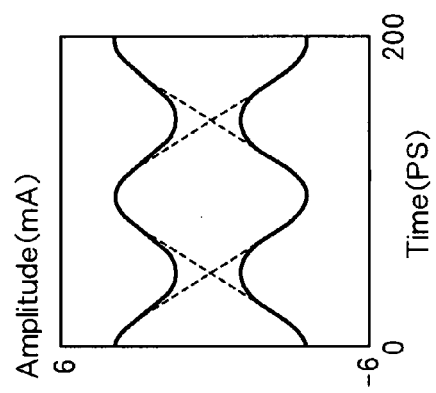

FIG. 8 is a block diagram of the fourth exemplary embodiment of the optical communication system according to the present invention. In FIG. 8, portions of the same configuration as FIG. 1 are given the same numbers, and a description thereof will be omitted.

The fourth exemplary embodiment shown in FIG. 8 is a method of generating a test signal just by the modulation by a clock signal 1201 instead of modulating the data modulator 103 of the optical transmitter portion 101 with the test pattern.

The clock modulator 104 is the LiNbO₃ Mach-Zehnder modulator of which DC bias is set to an optical transmission minimum point (null point). The ¼ clock signal 1201 having a frequency of ¼ of the bit rate B is applied to the clock modulator 104.

The ¼ clock signal should desirably be twice the half-wavelength voltage of the clock modulator. However, it may be lower than that if lowering of output light intensity is allowed. The signal modulated by the ¼ clock signal 1201 becomes a signal wherein the phases of consecutive 2 bits are equal and the phases are inverted for π at every 2 bits. This signal is more complicated in change of the intensity but has the same phase condition in comparison with the optical signal generated by the optical transmitter portion 101 of the first exemplary embodiment shown in FIG. 1. This phase modulation signal is converted to intensity modulation by the delay interferometer 107 and differentially received by the optical receiver 108. The output signal from the optical receiver 108 is input to the spectrum analyzer 111. The spectrum analyzer 111 detects the component of half the bit rate B from the input signal and detects whether or not there are the delay difference and intensity difference.

In the fourth exemplary embodiment shown in FIG. 8, the frequency component detected by the spectrum analyzer 111 may be the frequency component of the bit rate B. In this case, it is possible to detect whether or not there is the delay difference when the delay difference is small with high accuracy.

The fourth exemplary embodiment shown in FIG. 8 may be provided with a function of adjusting the delay or the level or both of them between the interferometer 107 and the optical receiver 108 so as to adjust the function to maximize the component of half the bit rate B detected by the spectrum analyzer 111.

As described above, a first advantage of the present invention is that it is possible to measure the performance of the receiver for a DPSK signal with an inexpensive device.

The reason for this is that the frequency component to be measured is in a narrow frequency range so that a wideband measuring device becomes unnecessary. It is because a narrowband measuring device is generally inexpensive, and it is realizable by combining low-price components such as the photo-detector and band-pass filter instead of the measuring device.

A second advantage is that it is possible to quantitatively measure the performance of the receiver for a DPSK signal.

The reason for this is that it is possible to evaluate the delay difference and level difference by the intensity of a specific frequency component so that it is no longer necessary to perform qualitative and personal evaluation, such as related graphic judgment of the eye pattern.

A third advantage is that it is possible to perform the measurement and detection without a particular measuring device.

The reason for this is that it is possible to use the transmitter portion of an optical transceiver as a test signal generator by providing a switch function which allows switching between a test signal and a data signal.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An evaluation method of an optical receiver of an optical communication system, including: a DPSK (Differential Phase Shift Keying) signal modulated by a specific data series; a delay interferometer for performing delay detection on the DPSK signal; an optical receiver for receiving each of two optical outputs of the delay interferometer and outputting a difference signal; and a spectrum analyzer for measuring a spectrum of an output electrical signal of the optical receiver, comprising:

monitoring a specific frequency component of the spectrum analyzer and detecting a delay difference and a deviation in optical reception level between the two outputs of the delay interferometer and the optical receiver.

2. The evaluation method of an optical receiver according to claim 1, wherein: the specific data series is a repetitive pattern of 4 bits of a binary code "0011"; and the specific frequency component is a component of a frequency of half a bit rate.

3. The evaluation method of an optical receiver according to claim 1, wherein: the specific data series is a repetitive pattern of 4 bits of a binary code "0011"; and the specific frequency component is a component of a bit rate frequency.

4. The evaluation method of an optical receiver according to claim 1, wherein: the specific data series is a repetitive pattern of 2 N (N is a positive integer)-bit overall length which becomes "1" of consecutive binary code N bits following "0" of the consecutive binary code N bits; and the specific frequency component is a component of a frequency of B/2 N against a bit rate B (B is a positive integer).

5. An evaluation method of an optical receiver of an optical communication system, including: a Mach-Zehnder modulator; a clock modulator for having the Mach-Zehnder modulator modulate a light source to a carrier-suppressed RZ (Return to Zero) with a clock of a B/N (B and N are positive integers) period; a delay interferometer for performing delay detection on an output signal of the Mach-Zehnder modulator; an optical receiver for receiving each of two optical outputs of the delay interferometer and outputting a difference signal; and a spectrum analyzer for measuring a spectrum of an output electrical signal of the optical receiver, comprising:

monitoring a specific frequency component of the spectrum analyzer and detecting a delay difference and a deviation in optical reception level between the two outputs of the delay interferometer and the optical receiver.

6. An adjustment method of an optical receiver of an optical communication system, including: a DPSK (Differential Phase Shift Keying) signal modulated by a specific data series; a delay interferometer for performing delay detection on the DPSK signal; an optical receiver for receiving each of two optical outputs of the delay interferometer and outputting a difference signal; an adjuster for adjusting intensity or delay or both of them of an optical signal provided to one or both of two paths between an output of the delay interferometer and an input of the optical receiver; and a spectrum analyzer for measuring a spectrum of an output electrical signal of the optical receiver, comprising: adjusting the intensity or delay or both of them of the adjuster to maximize a specific frequency component of the spectrum analyzer.

7. The adjustment method of an optical receiver according to claim 6, wherein: the specific data series is a repetitive pattern of 4 bits of a binary code "0011"; and
the specific frequency component is a component of a frequency of half a bit rate.

8. The adjustment method of an optical receiver according to claim 6, wherein: the specific data series is a repetitive pattern of 4 bits of a binary code "0011"; and
the specific frequency component is a component of a frequency of a bit rate.

9. The adjustment method of an optical receiver according to claim 6, wherein: the specific data series is a repetitive pattern of 2 N (N is a positive integer)-bit overall length which becomes "1" of consecutive binary code N bits following "0" of the consecutive binary code N bits; and the specific frequency component is a component of a frequency of B/2 N against a bit rate B (B is a positive integer).

10. An adjustment method of an optical receiver of an optical communication system, including: a Mach-Zehnder modulator; a clock modulator for having the Mach-Zehnder modulator modulate a light source to a carrier-suppressed RZ (Return to Zero) with a clock of a B/N (B and N are positive integers) period; a delay interferometer for performing delay detection on an output signal of the Mach-Zehnder modulator; an optical receiver for receiving each of two optical outputs of the delay interferometer and outputting a difference signal; and an adjuster for adjusting intensity or delay or both of them of an optical signal provided to one or both of two paths between an output of the delay interferometer and an input of the optical receiver; and a spectrum analyzer for measuring a spectrum of an output electrical signal of the optical receiver, comprising: adjusting the intensity or delay or both of them of the adjuster to maximize a specific frequency component of the spectrum analyzer.

11. An optical communication system using a DPSK (Differential Phase Shift Keying) signal, comprising:
an optical transmitter portion for outputting the DPSK signal modulated by a specific data series;
a delay interferometer for performing delay detection on the DPSK signal;
an optical receiver for receiving each of two optical outputs of the delay interferometer and outputting a difference signal, a delay difference and a deviation in optical reception level between the two optical outputs of the delay interferometer and the optical receiver is detected; and
a spectrum analyzer for measuring a spectrum of an output electrical signal of the optical receiver, a specific frequency component of the spectrum analyzer is monitored.

12. The optical communication system according to claim 11, wherein: the specific data series is a repetitive pattern of 4 bits of a binary code "0011."

13. The optical communication system according to claim 11, wherein: the specific data series is a repetitive pattern of 2 N (N is a positive integer)-bit overall length which becomes "1" of consecutive binary code N bits following "0" of the consecutive binary code N bits.

14. The optical communication system according to claim 11, comprising an adjuster for adjusting intensity or delay or both of them of an optical signal provided to one or both of two paths between an output of the delay interferometer and an input of the optical receiver.

15. The optical communication system according to claim 11, comprising a switch for inputting either the specific data series or transmission data to the optical transmitter portion.

16. The optical communication system according to claim 11, wherein the optical transmitter portion outputs the DPSK signal modulated by a specific clock instead of the specific data series.

17. An optical communication system using a DPSK (Differential Phase Shift Keying) signal, comprising:
an optical transmitter means of outputting the DPSK signal modulated by a specific data series;
a delay interferometer means of performing delay detection on the DPSK signal;
an optical receiver means of receiving each of two optical outputs of the delay interferometer means and outputting a difference signal, a delay difference and a deviation in optical reception level between the two optical outputs of the delay interferometer means and the optical receiver means is detected; and
a spectrum analyzer means of measuring a spectrum of an output electrical signal of the optical receiver means, a specific frequency component of the spectrum analyzer means is monitored.

* * * * *